US010579905B2

(12) United States Patent
Fanello et al.

(10) Patent No.: US 10,579,905 B2
(45) Date of Patent: Mar. 3, 2020

(54) FULLY PARALLEL, LOW COMPLEXITY APPROACH TO SOLVING COMPUTER VISION PROBLEMS

(71) Applicant: Google LLC, Mountain View, CA (US)

(72) Inventors: Sean Ryan Fanello, San Francisco, CA (US); Julien Pascal Christophe Valentin, San Francisco, CA (US); Adarsh Prakash Murthy Kowdle, San Francisco, CA (US); Christoph Rhemann, San Francisco, CA (US); Vladimir Tankovich, San Francisco, CA (US); Philip L. Davidson, Boston, MA (US); Shahram Izadi, Tiburon, CA (US)

(73) Assignee: GOOGLE LLC, Mountain View, CA (US)

( * ) Notice: Subject to any disclaimer, the term of this patent is extended or adjusted under 35 U.S.C. 154(b) by 213 days.

(21) Appl. No.: 15/925,141

(22) Filed: Mar. 19, 2018

(65) Prior Publication Data

US 2018/0300588 A1      Oct. 18, 2018

Related U.S. Application Data

(60) Provisional application No. 62/473,280, filed on Mar. 17, 2017.

(51) Int. Cl.
    *G06K 9/62*          (2006.01)
(52) U.S. Cl.
    CPC ......... *G06K 9/6256* (2013.01); *G06K 9/6202* (2013.01); *G06K 9/6276* (2013.01); *G06K 9/6298* (2013.01)

(58) Field of Classification Search
    None
    See application file for complete search history.

(56) References Cited

U.S. PATENT DOCUMENTS 9,589,048 B2 *   3/2017   Milton ............... G06Q 30/0261
10,417,653 B2 *  9/2019   Milton ............... G06Q 30/0205
                         (Continued)

OTHER PUBLICATIONS

Mezzoudj, Saliha, Rachid Seghir, and Yassmina Saadna. "A Parallel Content-Based Image Retrieval System Using Spark and Tachyon Frameworks." Journal of King Saud University-Computer and Information Sciences (2019). (Year: 2019).*

(Continued)

*Primary Examiner* — Andrae S Allison

(57) ABSTRACT

Values of pixels in an image are mapped to a binary space using a first function that preserves characteristics of values of the pixels. Labels are iteratively assigned to the pixels in the image in parallel based on a second function. The label assigned to each pixel is determined based on values of a set of nearest-neighbor pixels. The first function is trained to map values of pixels in a set of training images to the binary space and the second function is trained to assign labels to the pixels in the set of training images. Considering only the nearest neighbors in the inference scheme results in a computational complexity that is independent of the size of the solution space and produces sufficient approximations of the true distribution when the solution for each pixel is most likely found in a small subset of the set of potential solutions.

33 Claims, 3 Drawing Sheets

(56) References Cited

U.S. PATENT DOCUMENTS

| | | | | |
|---|---|---|---|---|
| 2006/0074908 | A1* | 4/2006 | Selvaraj | G06K 9/6269 |
| 2006/0088202 | A1* | 4/2006 | Venkatachalam | G06T 5/30 382/152 |
| 2006/0179020 | A1* | 8/2006 | Bradski | G06K 9/00523 706/20 |
| 2010/0173269 | A1* | 7/2010 | Puri | G09B 19/0092 434/127 |
| 2014/0108309 | A1* | 4/2014 | Frank | G06Q 10/00 706/12 |
| 2014/0108842 | A1* | 4/2014 | Frank | G06F 17/28 713/323 |
| 2016/0300252 | A1* | 10/2016 | Frank | G06Q 30/0203 |
| 2016/0379055 | A1* | 12/2016 | Loui | G06K 9/00765 382/103 |
| 2017/0011091 | A1* | 1/2017 | Chehreghani | G06F 16/22 |
| 2017/0140012 | A1* | 5/2017 | Bortnikov | G06F 17/10 |
| 2017/0249535 | A1* | 8/2017 | Swaminathan | G06K 9/6215 |
| 2017/0278135 | A1* | 9/2017 | Majumdar | G06Q 30/0256 |
| 2018/0330201 | A1* | 11/2018 | Witbrock | G06K 9/6278 |

OTHER PUBLICATIONS

Duan et al, A Parallel Multiclassification Algorithm for Big Data Using an Extreme Learning Machine, IEEE Transactions on Neural Networks and Learning Systems, vol. 29, No. 6, Jun. 2018 2337. (Year: 2018).*

Ben-Nun, Tal, and Torsten Hoefler. "Demystifying parallel and distributed deep learning: An in-depth concurrency analysis." ACM Computing Surveys (CSUR) 52.4 (2019): 65. (Year: 2019).*

Xu et al, Image classification model based on spark and CNN, MATEC Web of Conferences 189, 03012 (Jan. 2018) (Year: 2018).*

Prashanth, Duddela Sai, and C. N. Panini. "KNN classification of Kannada Characters using Hu's Seven Variants and Zernike Moment." Nagendra Panini Challa on Aug. 10, 2017. (Year: 2017).*

Y. Geng and J. Zhang, "Optimized Parallelization of Binary Classification Algorithms Based on Spark," 2016 9th International Symposium on Computational Intelligence and Design (ISCID), Hangzhou, 2016, pp. 83-86. (Year: 2016).*

7 Batiz-Benet, J., Slack, Q., Sparks, M., & Yahya, A.I. (2010). Parallelizing Machine Learning Algorithms, https://www.semanticscholar.org/paper/Parallelizing-Machine-Learning-Algorithms-Batiz-Benet-Slack/6252cf3ce7b0511d7153cc0859de25ac427f9b56#references (Year: 2010).*

8 Song, Yang, Alexander Schwing, and Raquel Urtasun. "Training deep neural networks via direct loss minimization." International Conference on Machine Learning. 2016. (Year: 2016).*

Barnes, et al., PatchMatch: A Randomized Correspondence Algorithm for Structural Image Editing ACM Transactions on Graphics (Proc. SIGGRAPH), Aug. 2009, New Orleans, LA, USA, 10 pages.

Bauschke, et al., Convex analysis and monotone operator theory in Hilbert spaces, vol. 2011, New York: Springer, 2017.

Besag, On the statistical analysis of dirty pictures, Journal of the Royal Statistical Society. Series B (Methodological) (1986): 259-302.

Bleyer, et al., PatchMatch Stereo-Stereo Matching with Slanted Support Windows, Bmvc., vol. 11, 2011, 11 pages.

Bolte, et al., Proximal alternating linearized minimization or nonconvex and nonsmooth problems, Mathematical Programming, 146.1-2 (2014): 459-494, 36 pages.

Boyd, et al., Convex optimization, Chapter 9, Cambridge university press, 2004, 53 pages.

Boykov, et al., Fast approximate energy minimization via graph cuts, IEEE Transactions on pattern analysis and machine intelligence 23.11 (2001): 1222-1239, 18 pages.

Carreira-Perpin, et al., Flashing with binary autoencoders, 2015 IEEE Conference on Computer Vision and Pattern Recognition (CVPR), IEEE, 2015, 10 pages.

Charikar, Similarity estimation techniques from rounding algorithms, Proceedings of the thiry-fourth annual ACM symposium on Theory of computing, ACM, 2002, 9 pages.

Cheng, et al., Densecut: Densely connected crfs for realtime grabcut, Computer Graphics Forum. vol. 34. No. 7. 2015, 9 pages.

Coubariaux, et al., Binaryconnect: Training deep neural networks with binary weights during propagations, Advances in neural information processing systems, 2015, 9 pages.

Coubariaux, et al., Binarized neural networks: Training deep neural networks with weights and activations constrained to+ 1 or-1, arXiv preprint arXiv:1602.02830 (2016), 11 pages.

Dalal, et al. Histograms of Oriented Gradients for Human Detection, International Conference on Computer Vision & Pattern Recognition (CVPR '05), Jun. 2005, San Diego, United States. IEEE Computer Society, 1, pp. 886-893, 2005, <http://ieeexplore.ieee.org/xpls/abs_all.jsp?arnumber=1467360>. <10.1109/CVPR.2005.177>. <inria-00548512>, 9 pages.

Dou, et al., Fusion4D: Real-time Performance Capture of Challenging Scenes, SIGGRAPH '16 Technical Paper, Jul. 24-28, 2016, Anaheim, CA, ISBN: 978-1-4503-4279-7/16107, DOI: http://dx.doi.org/10.1145/2897824.2925969, 13 pages.

Fanello, et al., HyperDepth: Learning Depth from Structured Light without Matching, CVPR, vol. 2, No. 3, 2016, 4 pages.

Fanello, et al., UltraStereo: Efficient Learning-based Matching for Active Stereo Systems, Computer Vision and Pattern Recognition (CVPR), 2017 IEEE Conference on. IEEE, 2017, 10 pages.

Felzenszwalb, et al., Efficient belief propagation for early vision, International journal of computer vision 70.1 (2006): 41-54.

Fuchs, Spread representations, Asilomar Conference on Signals, Systems, and Computers, Nov. 2011, Pacific Grove, United States, 2011, <hal-00700734>, 5 pages.

Gong, et al., Iterative Quantization: A Procrustean Approach to Learning Binary Codes for Large-scale Image Retrieval, IEEE Transactions on Pattern Analysis and Machine Intelligence 3512 (2013), 8 pages.

Han, et al., Deep compression: Compressing deep neural networks with pruning, trained quantization and huffman coding, arXiv preprint arXiv:1510.00149 (2015), 14 pages.

He, et al., Compact hashing with joint optimization of search accuracy and time, Computer Vision and Pattern Recognition (CVPR), 2011 IEEE Conference on. IEEE, 2011, 8 pages.

Iandola, et al., SqueezeNet: AlexNet-level accuracy with 50x fewer parameters and< 0.5 MB model size, arXiv preprint arXiv:1602.07360 (2016), 13 pages.

Indyk, et al., Approximate nearest neighbors: towards removing the curse of dimensionality, Proceedings of the thirtieth annual ACM symposium on Theory of computing. ACM, 1998, 10 pages.

Jegou, et al., Searching with quantization: approximate nearest neighbor search using short codes and distance estimators. [Research Report] RR-7020, INRIA. 2009, pp. 25. <inria-00410767>, 29 pages.

Jegou, et al., Anti-sparse coding for approximate nearest neighbor search, ICASSP—37th International Conference on Acoustics, Speech, and Signal Processing, Mar. 2012, Kyoto, Japan, 2012, <hal-00661591>, 5 pages.

Koller, et al., Probabilistic graphical models: principles and techniques. MIT press, 2009, 16 pages.

Kolmogorov, Convergent tree-reweighted message passing for energy minimization. IEEE transactions on pattern analysis and machine intelligence 28.10 (2006): 1568-1583, 8 pages.

Krahenbuhl, et al., Efficient inference in fully connected crfs with gaussian edge potentials, Advances in neural Information processing systems, 2011, 9 pages.

Krizhevsky, et al., Imagenet classification with deep convolutional neural networks, Advances in neural information processing systems, 2012, 8 pages.

Kurdyka, On gradients of functions definable in o-minimal structures, Annales de l'institut Fourier, vol. 48, No. 3, Chartres: L'Institut, 1950-, 1998 16 pages.

Lowe, Object recognition from local scale-invariant features, Computer vision, 1999, The proceedings of the seventh IEEE international conference on. vol. 2. Ieee, 1999, 8 pages.

(56) References Cited

OTHER PUBLICATIONS

Lowe, Distinctive image features from scale-invariant keypoints, International journal of computer vision 60.2 (2004): 91-110, 32 pages.

Lu, et al., Patch match filter: Efficient edge-aware filtering meets randomized search for fast correspondence field estimation, Computer Vision and Pattern Recognition (CVPR), 2013 IEEE Conference on. IEEE, 2013, 8 pages.

Lyubarskii, et al., Uncertainty principles and vector quantization, IEEE Transactions on Information Theory 56.7 (2010): 3491-3501, 13 pages.

Nair, et al., Rectified linear units improve restricted boltzmann machines, Proceedings of the 27th international conference on machine learning (ICML-10), 2010, 8 pages.

Orts-Escolano, et al., Proceedings of the 29th Annual Symposium on User Interface Software and Technology, Tokyo, Japan, Oct. 2016, ACM, pp. 741-754.

Raginsky, et al., Locality-sensitive binary codes from shift-invariant kernels, Advances in neural information processing systems, 2009, 9 pages.

Rastegari, et al., Computationally bounded retrieval, Proceedings of the IEEE Conference on Computer Vision and Pattern Recognition, 2015, 9 pages.

Rastegari, et al., Xnomet: Imagenet classification using binary convolutional neural networks. European Conference on Computer Vision. Springer, Cham, 2016, 17 pages.

Razaviyayn, et al., A unified convergence analysis of block successive minimization methods for nonsmooth optimization. SIAM Journal on Optimization 23.2 (2013): 1126-1153, 34 pages.

Rhemann, et al., Fast cost-volume filtering for visual correspondence and beyond, IEEE transactions on pattern analysis and machine intelligence 35.2 (2013): 504, 8 pages.

Rother, et al., Optimizing binary MRFs via extended roof duality, Computer Vision and Pattern Recognition, 2007, CVPR'07, IEEE Conference on. IEEE, 2007, 8 pages.

Strecha, et al., LDAHash: Improved matching with smaller descriptors, IEEE transactions on pattern analysis and machine intelligence 34.1 (2012): 66-78.

Studer, et al., Democratic representations, arXiv preprint arXiv:1401. 3420, 2014, 43 pages.

Tappen, et al., Comparison of graph cuts with belief propagation for stereo, using identical MRF parameters, IEEE, 2003, 8 pages.

Tola, et al., DAISY: An Efficient Dense Descriptor Applied to Wide-Baseline Stereo, in IEEE Transactions on Pattern Analysis and Machine Intelligence, vol. 32, No. 5, pp. 815-830, May 2010, doi: 10.1109/TPAMI.2009.77, 16 pages.

Tseng, Convergence of a block coordinate descent method for nondifferentiable minimization, Journal of optimization theory and applications 109.3 (2001): 475-494, 20 pages.

Valentin, et al., Semanticpaint: Interactive 3d labeling and learning at your fingertips, ACM Transactions on Graphics (TOG) 34.5 (2015): 154, 16 pages.

Vineet, et al., Filter-based mean-field inference for random fields with higher-order terms and product label-spacesm, International Journal of Computer Vision 110.3 (2014): 290-307.

Wainwright, et al., MAP estimation via agreement on trees: message-passing and linear programming, IEEE transactions on information theory 51.11 (2005): 3697-3717, 21 pages.

Wang, et al., Hashing for similarity search: A survey, arXiv preprint arXiv:1408.2927 (2014) 29 pages.

Wang, et al., The global patch collider, Proceedings of the IEEE conference on computer vision and pattern recognition, 2016, 9 pages.

Wang, et al., Binary compressive sensing via sum of l1-norm and l (infinity)-norm regularization, Military Communications Conference, MILCOM 2013-2013 IEEE. IEEE, 2013.

Weiss, et al., Spectral hashing, Advances in neural information processing systems, 2009, 8 pages.

Yao, et al.,On early stopping in gradient descent learning. Constructive Approximation 26.2 (2007): 289-315, 26 pages.

Yu, et al., Circulant binary embedding, International conference on machine learning. 2014, 9 pages.

\* cited by examiner

FULLY PARALLEL, LOW COMPLEXITY APPROACH TO SOLVING COMPUTER VISION PROBLEMS

CROSS REFERENCE TO RELATED APPLICATIONS

This application claims priority to U.S. Provisional Patent Application 62/473,280, entitled "Low Compute and Fully Parallel Computer Vision with HashMatch" and filed on Mar. 17, 2017, the entirety of which is incorporated by reference herein.

BACKGROUND

Machine learning is used in many classes of computer vision problems including identification of stereo images, object classification, foreground/background segmentation, disparity estimation, image retrieval, feature approximation, background subtraction, and the like. These problems are typically formulated as a per-pixel image labeling task. For example, pixels in a stereo image are labeled as "left" or "right," to indicate the pixels that are intended to be viewed by the left eye or the right eye, respectively. Computer vision labelling problems are conventionally formulated as conditional random fields (CRFs), which have been shown to provide precise and accurate labeling of the pixels in images. However, the computational complexity of the CRF approach precludes using these approaches in low-compute scenarios such as implementations that solve the computer vision problems in devices such as smart phones, tablet computers, and the like. An alternative approach consists of using deep architectures such as convolutional neural networks (CNNs) to solve general computer vision problems, but these methods also require a considerable amount of computational resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The efficiency of conventional deep learning techniques can be improved using compression techniques such as the use of binary weights for the input to a convolutional neural network (CNN) and the filters implemented in the CNN, removal of redundant connections and sharing of quantized weights by multiple neurons of a CNN, implementing compact CNN layers that are characterized by a reduced number of parameters, and binarizing the full network. Despite the improved efficiency, these approaches still require multiple convolutions to infer the per-pixel labels. Multiple memory accesses are also required to retrieve stored image patches from memory. The algorithms are therefore both memory and computationally bound. The computational complexity therefore increases in proportion to the sample size, e.g., the number of pixels in an image.

At least some of the drawbacks in conventional solutions to computer vision problems are reduced or eliminated using a general inference framework (referred to herein as Hash-Match) that is performed in parallel on images with a complexity that is independent of size of input, e.g., the number of pixels in a patch, by training a binary unary potential using sparsity and anti-sparsity constraints. The binary unary potential is utilized in an inference scheme that estimates a true distribution of labels that is independent of the solution space. Some embodiments of the binary unary potential are represented by a first function that maps values of the pixels to a binary space that preserves characteristics of the values of the pixels. The binary unary function is also represented by a second function that learns to perform a labeling task to assign labels to the pixels in the image. In some embodiments, the first and second functions are determined based on regularizers that are trained based on sets of training images. A reconstruction function is used to verify that the original data is reconstructed from the binary unary potential. The inference scheme estimates the label for each pixel by selecting a value that is equal to a value of a label of a nearest-neighbor pixel to the pixel based on the corresponding independent per-pixel distribution. The inference scheme is then iterated, e.g., using a coordinate ascent procedure, until values of the labels of the pixels converge. Considering only the nearest neighbors in the inference scheme results in a computational complexity that is independent of the size of the solution space and produces good approximations of the true distribution when the solution for each pixel is most likely found in a small subset of the set of potential solutions, e.g., the entropy of the solution is low.

Figure 1:
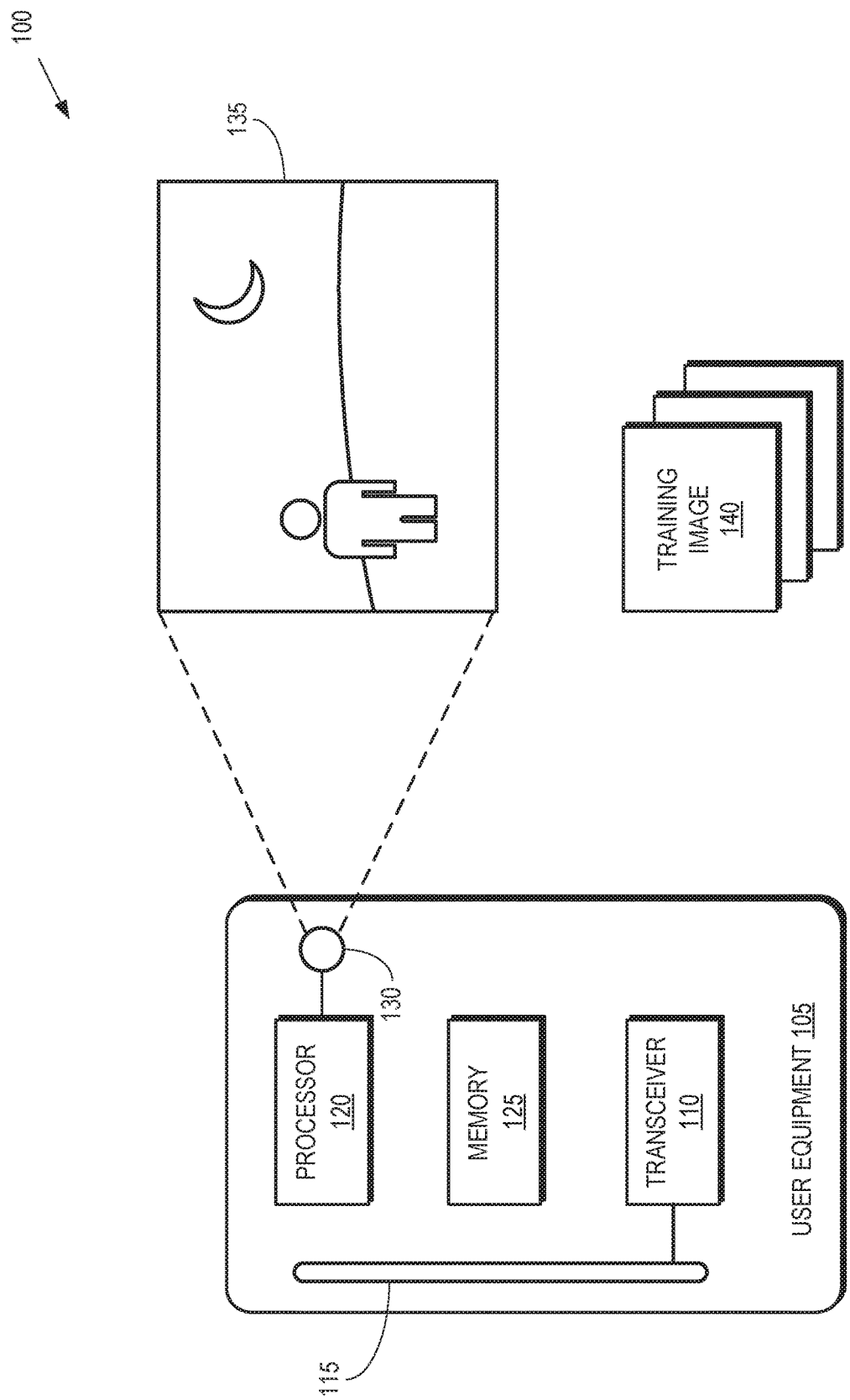
FIG. 1 is a block diagram of a processing system that is configured to solve computer vision problems according to some embodiments.

FIG. 1 is a block diagram of a processing system 100 that is configured to solve computer vision problems according to some embodiments. The processing system 100 includes a user equipment 105 such as a smart phone, a tablet, or a laptop computer. However, some embodiments of the processing system 100 include other devices that are configured to solve computer vision problems such as desktop computers, servers, and the like. Examples of computer vision problems that are addressed by the processing system 100 include identification of stereo images, object classification, foreground/background segmentation, disparity estimation, image retrieval, feature approximation, background subtraction, and the like.

The user equipment 105 includes a transceiver 110 for transmitting and receiving signals over an air interface via antenna 115. The user equipment 105 also includes a processor 120 and a memory 125. The processor 120 may be used to execute instructions stored in the memory 125 and to store information in the memory 125 such as the results of the executed instructions. The user equipment 105 also implements a camera 130 that is used to acquire images such as the image 135. The processor 120 is configured to operate on pixels representative of the image 135 and the memory 125 is configured to store values of the pixels of the image 135. Although the camera 130 is integral to the user equipment 105, some embodiments of the user equipment 105 (or other processing devices) operate on images acquired by external image acquisition devices.

The processor 120 maps values of pixels in the image 135 to a binary space using a first function that preserves characteristics of values of the pixels. Labels are iteratively assigned to the pixels in the image 135 in parallel based on a second function. The label assigned to each pixel is determined based on values of a set of nearest-neighbor pixels. In some embodiments, the labels for the pixels in the image 135 are then stored in the memory 125. The first and second functions are trained prior to using the first and second functions to estimate labels for the pixels in the image 135. In the illustrated embodiment, the first function is trained to map values of pixels in a set of training images 140 to the binary space and the second function is trained to assign labels to the pixels in the set of training images 140. Training of the first and second functions is performed by the processor 120 or by an external processor, which then provides information representative of the trained first and second functions to the user equipment 105.

Some embodiments of the processor 120 implement a fully parallel and low complexity technique that is based on a pairwise conditional random field (CRF) that is expressed as a probabilistic factorization, P, where:

$$P(Y \mid D) = \frac{1}{Z(D)} e^{-E(Y \mid D)} \quad (1)$$

$$E(Y \mid D) = \sum_i \psi_u(l_i) + \sum_i \sum_{j \in N_j} \psi_p(l_i, l_j) \quad (2)$$

where E can be interpreted as a measure of error and a data term $\psi_u$ measures how well an inferred solution agrees with input data, e.g., actual values of the pixels in the training images 140 or a cost of assigning a pixel i to a label $l_i$. The first summation captures the likelihood for a particular solution but does not consider values of neighboring pixels, which can lead to a noisy solution. The second summation considers the nearest neighbors to a pixel and provides regularization of the solution such that a label for a pixel is similar to labels for pixels of the nearest neighbors.

The implementation of the data term $\psi_u$ depends on the labeling task that is being performed by the processor 120. For example, if the processor 120 is tasked with finding a nearest neighbor between image patches, the labels $l_i$ correspond to vectors (u, v) that define displacements in the image directions. In that case, the data term $\psi_u$ is represented as:

$$\psi_u(l_i) = |h(x_i) - h(x_{i+l_i})|, \quad (3)$$

which measures the compatibility of two image patches x centered at two-dimensional pixel locations i and $i+l_i$. The function h(x) is a binary feature that allows efficient computation of $\psi_u(l_i)$ via a Hamming distance. For another example, other classification or regression problems are addressed by representing the data term $\psi_u$ as:

$$\psi_u(l_i) = -\log(g(l_i, h(x_i))), \quad (4)$$

where g is a learned classifier or aggressor that evaluates the likelihood of label $l_i$ given the binary code $h(x_i)$ of an image patch $x_i$.

The smoothness cost $\psi_p$ is represented as $$\psi_p(x_i = l_i, x_j = l_j) = \max(\tau, |l_i - l_j|). \quad (5)$$

The smoothness function encourages neighboring pixels to be assigned similar labels and the value $\tau$ is a truncation threshold.

Figure 2:
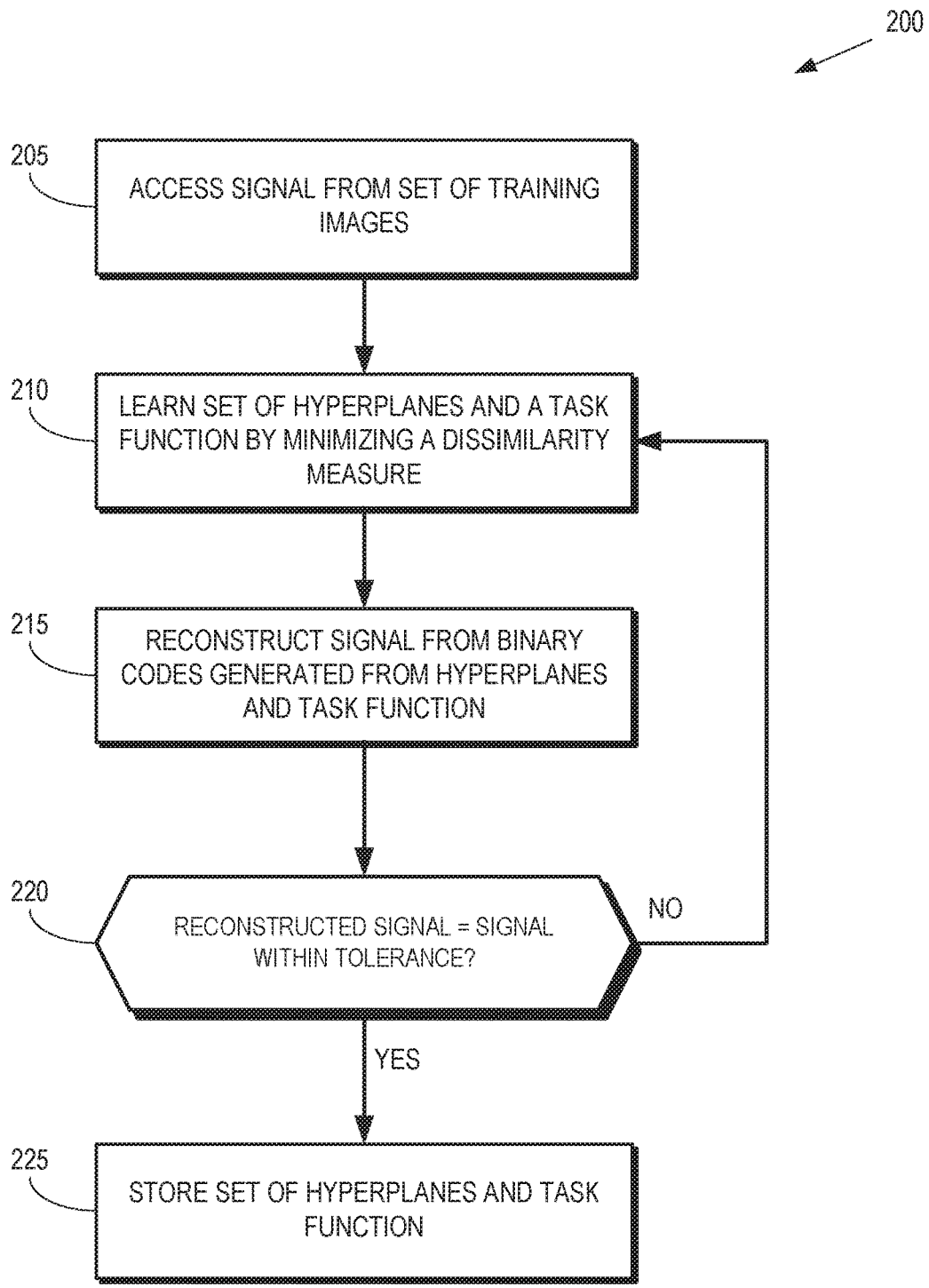
FIG. 2 illustrates a method of training first and second functions that are used to solve computer vision problems according to some embodiments.

FIG. 2 illustrates a method 200 of training the first and second functions that are used to solve computer vision problems according to some embodiments. Some embodiments of the method 200 are implemented in the processor 120 shown in FIG. 1. Other embodiments of the method 200 are implemented in other processors and information representing the trained first and second functions is provided to the processor 120 shown in FIG. 1 so that the processor 120 is able to use the trained first and second functions to perform computer vision tasks, as discussed herein.

At block 205, the processor accesses a signal from a set of training images, e.g., values that represent the pixels in the training images. In some embodiments, the processor trains the function $h(x_i)$ to map a signal $x \in \mathbb{R}^n$ in a binary space $b \in \{0,1\}^k$, which preserves characteristics of the original signal.

At block 210, the processor learns a set of hyperplanes and a task function by minimizing a dissimilarity measure. In some embodiments, the processor learns a set of hyperplanes $W \in \mathbb{R}^{n \times k}$ and a task function $Z \in \mathbb{R}^{k \times d}$ that minimizes a loss function:

$$\min_{W,Z} \mathcal{L}(\text{sign}(XW)Z, Y) + \Gamma(W) + \Omega(Z) \quad (6)$$

where sign( ) is a function that returns a sign of the operand and $X \in \mathbb{R}^{m \times n}$ and $Y \in \mathbb{R}_{m \times d}$ are matrices whose i-th row corresponds respectively to $x_i$ and $y_i$. The terms $\Gamma(W)$ and $\Omega(Z)$ are regularizers that encourage particular structures on the predictors W and Z. In some embodiments, the regularizer $\Gamma(W)$ is chosen to induce sparse solutions in the set of hyperplanes. Optimization of the loss function cannot be performed using first-order methods such as back propagation because the functions are piece-wise constant and the sub-gradient with respect to W is zero almost everywhere. Instead, a dissimilarity measure, D, is introduced, which modifies the problem to:

$$\min_{W,Z,B} \mathcal{L}(B, Z, Y) + \Gamma(W) + \Omega(Z) + \gamma \mathcal{D}(XW, B) \quad (7)$$

subject to the constraint that:

$$\|B\|_\infty \leq \mu$$

where $$\|B\|_\infty = \max_{i,j} |B_{ij}|$$

denotes the $l_\infty$ norm of B and $\mu > 0$ is a scalar hyperparameter. This constraint is referred to as an anti-sparsity constraint.

At block 215, the processor reconstructs an estimate of the original signal using the hyperplanes and task function generated in block 210. In some embodiments, a reconstruction function is used to generate the estimate of the original signal based on the hyperplanes and the task function. The estimated signal is then used as a feedback signal to evaluate the quality of the hyperplanes and the task function.

At decision block 220, the processor determines whether the reconstructed signal is equal to the actual signal within a predetermined tolerance. If not, the method 200 flows to block 210 and iteratively updates the estimate of the hyperplanes and the task function. In some embodiments, the values of the task function are iteratively updated using a gradient descent technique. If the processor determines that the reconstructed signal is within the predetermined tolerance of the actual signal, the method 200 flows to block 225 and the set of hyperplanes and the task function are stored in a memory, such as the memory 125 shown in FIG. 1.

Figure 3:
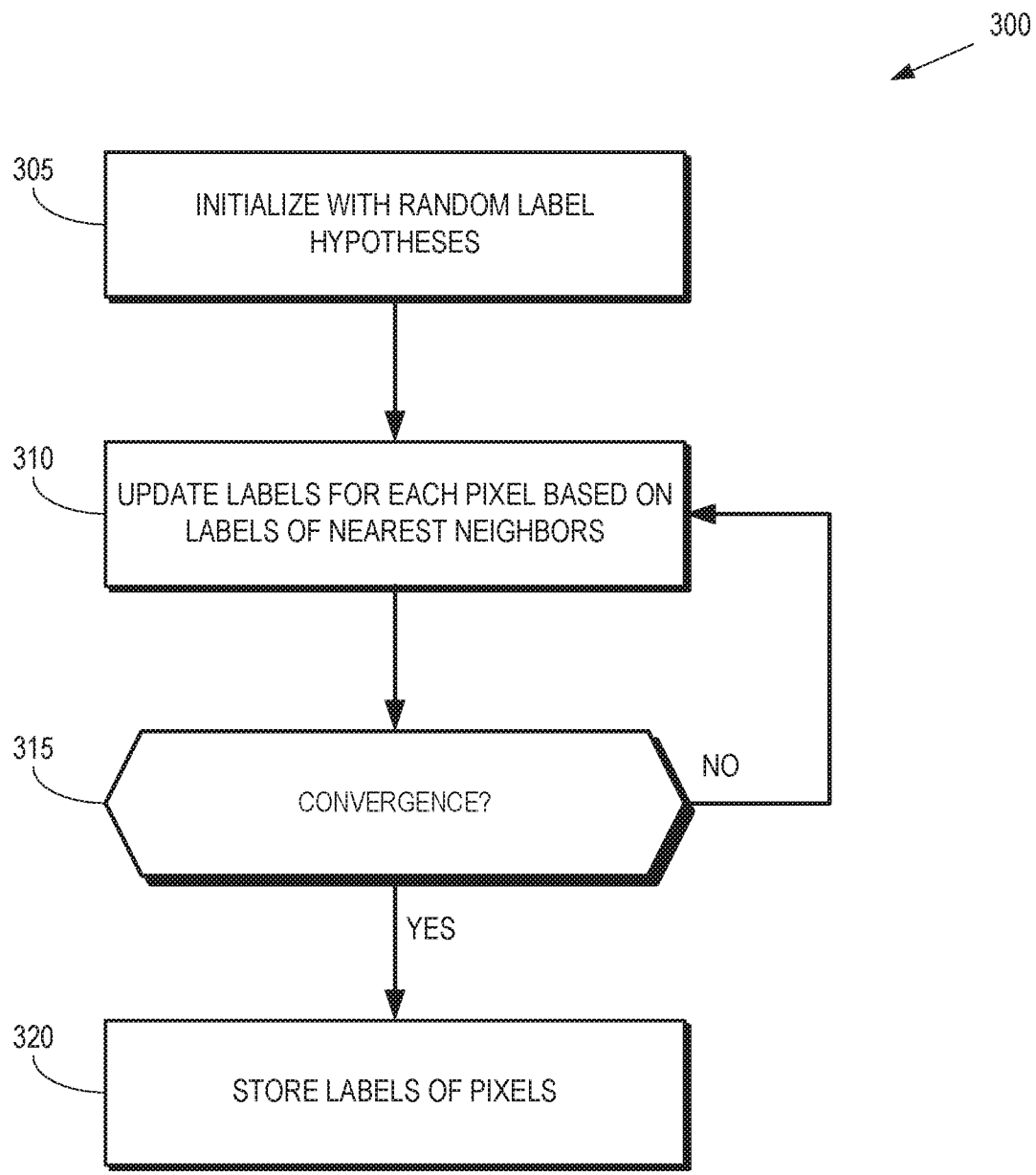
FIG. 3 is a flow diagram of a method of generating labels for pixels in an image according to some embodiments.

FIG. 3 is a flow diagram of a method 300 of generating labels for pixels in an image according to some embodiments. The method 300 is implemented in some embodiments of the processor 120 shown in FIG. 1. In order to generate labels for the pixels in parallel using a parallel inference technique, a true distribution (e.g., the distribution P in equation 1) of labels over the pixels is approximated by a distribution Q within a class of distributions that is factorized as a product of independent marginals:

$$Q(Y) = \Pi_i Q(Y_i) \quad (8)$$

This approximation is expected to provide a good approximation of the true distribution in cases when the unary potentials that represent the actual solutions have strong peaks at the actual values of the labels, e.g., the solutions have low entropy.

At block 305, values of the labels are initialized using a random label hypothesis to assign random labels to each pixel. A coordinate ascent procedure is then used to update the values of the labels. Using the coordinate ascent procedure guarantees that the iterative method 300 will converge on a solution.

At block 310, values of the labels are updated. An update for the label $l_i$ in the marginal of random variable $x_i$ can be generated according to:

$$Q_i^t(l_i) = \frac{1}{Z_i} e^{-M_i(l_i)} \quad (9)$$

$$M_i = \psi_u(l_i) + \sum_{j \in N_i} \sum_{l_j \in \mathcal{L}} Q_j^{t-1} \psi_p(l_i, l_j) \quad (10)$$

$$Z_i = \sum_{l_i \in \mathcal{L}} e^{-M_i(l_i)} \quad (11)$$

However, the complexity of evaluating the updated values according to the equations (9), (10), and (11) is $O(|Y||\mathcal{L}|(|\mathcal{N}||\mathcal{L}|+1))$, which is quadratic in $\mathcal{L}$. Consequently, this approach becomes computationally slow as the size of the label space increases and is therefore impractical for implementation on devices with limited resources such as smart phones, tablets, and the like. In some embodiments, this drawback is addressed by only considering values of labels of nearest neighbor pixels. The solution is further approximated by assuming that the distribution Q has low entropy and is therefore reasonably well approximated by a Dirac δ function. In this approximation, equation (10) is rewritten as:

$$M_i = \psi_u(l_i) + \sum_{j \in N_i} \psi_p(l_i, \arg\max_{l_j} Q_j) \quad (12)$$

This is equivalent to updating the labels of the pixels i to a maximal value of the marginal functions of the nearest neighbor pixels. The compute complexity of the modified problem is $O(|Y||\mathcal{N}|(1+|\mathcal{N}|))$, which is independent of the size of the label space $|\mathcal{L}|$. In practice the value of $|\mathcal{N}|$ is small, e.g., on the order of four or eight, and in most problems $|\mathcal{L}| > |\mathcal{N}|$. For example, when estimating disparities in an image, the size of the label space $|\mathcal{L}|$ is typically in the hundreds.

At decision block 315, the processor determines whether the updating procedure has converged. If not, the method 300 flows back to block 310 to update labels for the pixels in the image. If the updating procedure has converged, the method 300 flows to block 320 and stores the labels of the pixels, e.g., in a memory such as the memory 125 shown in FIG. 1.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    mapping values of pixels in an image to a binary space using a first function that preserves characteristics of values of the pixels;
    iteratively assigning labels to the pixels in the image in parallel based on a second function, wherein the label assigned to each pixel is determined based on values of a set of nearest-neighbor pixels.

2. The method of claim 1, further comprising:
    training the first function to map values of pixels in a set of training images to the binary space; and
    training the second function to assign labels to the pixels in the set of training images.

3. The method of claim 2, wherein training the first and second functions comprises reconstructing estimated values of pixels in the set of training images from the values of the pixels in the binary space and iteratively updating the first and second functions based on a comparison of actual values of the pixels in the set of training images and the estimated values.

4. The method of claim 3, wherein training the first and second functions comprises learning a set of hyperplanes and a task function that minimize a loss function subject to an anti-sparsity constraint.

5. The method of claim 4, wherein training the first and second functions comprises training first and second regularizer functions using the set of training images, wherein the first and second regularizer functions encourage corresponding structures for the set of hyperplanes and the task function.

6. The method of claim 5, wherein learning the set of hyperplanes comprises iteratively updating values of the set of hyperplanes based on the first regularizer, wherein the first regularizer is chosen to induce sparse solutions in the set of hyperplanes.

7. The method of claim 6, wherein learning the task function comprises iteratively updating values of the task function using a gradient descent technique.

8. The method of claim 1, wherein iteratively assigning the labels to the pixels in parallel comprises estimating distributions of labels of the pixels as independent marginal functions.

9. The method of claim 8, wherein estimating the distributions of the labels of the pixels as independent marginal functions comprises estimating the distributions of the labels of the pixels as Dirac δ functions.

10. The method of claim 9, wherein iteratively assigning the labels to the pixels in parallel comprises assigning, during an iteration, the labels of the pixels to a maximal value of the marginal functions of the nearest neighbor pixels.

11. The method of claim 8, wherein iteratively assigning the labels to the pixels in parallel comprises iteratively assigning the labels to the pixels in parallel using a coordinate ascent procedure until convergence.

12. An apparatus comprising:
    a processor configured to map values of pixels in an image to a binary space using a first function that preserves characteristics of values of the pixels and iteratively assign labels to the pixels in the image in parallel based on a second function, wherein the label assigned to each pixel is determined based on values of a set of nearest-neighbor pixels; and
    a memory to store the labels of the pixels.

13. The apparatus of claim 12, wherein the first function is trained to map values of pixels in a set of training images to the binary space and the second function is trained to assign labels to the pixels in the set of training images.

14. The apparatus of claim 13, wherein training the first and second functions comprises reconstructing estimated values of pixels in the set of training images from the values of the pixels in the binary space and iteratively updating the first and second functions based on a comparison of actual values of the pixels in the set of training images and the estimated values.

15. The apparatus of claim 14, wherein training the first and second functions comprises learning a set of hyperplanes and a task function that minimize a loss function subject to an anti-sparsity constraint.

16. The apparatus of claim 15, wherein training the first and second functions comprises training first and second regularizer functions using the set of training images, wherein the first and second regularizer functions encourage corresponding structures for the set of hyperplanes and the task function.

17. The apparatus of claim 16, wherein learning the set of hyperplanes comprises iteratively updating values of the set of hyperplanes based on the first regularizer, wherein the first regularizer is chosen to induce sparse solutions in the set of hyperplanes.

18. The apparatus of claim 17, wherein learning the task function comprises iteratively updating values of the task function using a gradient descent technique.

19. The apparatus of claim 12, wherein the processor is configured to estimate distributions of labels of the pixels as independent marginal functions.

20. The apparatus of claim 19, wherein the processor is configured to estimate the distributions of the labels of the pixels as Dirac δ functions.

21. The apparatus of claim 20, wherein the processor is configured to assign, during an iteration, the labels of the pixels to a maximal value of the marginal functions of the nearest neighbor pixels.

22. The apparatus of claim 19, wherein the processor is configured to iteratively assign the labels to the pixels in parallel using a coordinate ascent procedure until convergence.

23. A non-transitory computer readable medium embodying a set of executable instructions, the set of executable instructions to manipulate at least one processor to:
    map values of pixels in an image to a binary space using a first function that preserves characteristics of values of the pixels;
    iteratively assign labels to the pixels in the image in parallel based on a second function, wherein the label assigned to each pixel is determined based on values of a set of nearest-neighbor pixels.

24. The non-transitory computer readable medium of claim 23, wherein the set of executable instructions is to manipulate the at least one processor to:
    train the first function to map values of pixels in a set of training images to the binary space; and train the second function to assign labels to the pixels in the set of training images.

25. The non-transitory computer readable medium of claim 24, wherein the set of executable instructions is to manipulate the at least one processor to reconstruct estimated values of pixels in the set of training images from the values of the pixels in the binary space and iteratively updating the first and second functions based on a comparison of actual values of the pixels in the set of training images and the estimated values.

26. The non-transitory computer readable medium of claim 25, wherein the set of executable instructions is to manipulate the at least one processor to learn a set of hyperplanes and a task function that minimize a loss function subject to an anti-sparsity constraint.

27. The non-transitory computer readable medium of claim 26, wherein the set of executable instructions is to manipulate the at least one processor to train first and second regularizer functions using the set of training images, wherein the first and second regularizer functions encourage corresponding structures for the set of hyperplanes and the task function.

28. The non-transitory computer readable medium of claim 27, wherein the set of executable instructions is to manipulate the at least one processor to iteratively update values of the set of hyperplanes based on the first regularizer, wherein the first regularizer is chosen to induce sparse solutions in the set of hyperplanes.

29. The non-transitory computer readable medium of claim 28, wherein the set of executable instructions is to manipulate the at least one processor to iteratively update values of the task function using a gradient descent technique.

30. The non-transitory computer readable medium of claim 23, wherein the set of executable instructions is to manipulate the at least one processor to estimate distributions of labels of the pixels as independent marginal functions.

31. The non-transitory computer readable medium of claim 30, wherein the set of executable instructions is to manipulate the at least one processor to estimate the distributions of the labels of the pixels as Dirac $\delta$ functions.

32. The non-transitory computer readable medium of claim 31, wherein the set of executable instructions is to manipulate the at least one processor to assign, during an iteration, the labels of the pixels to a maximal value of the marginal functions of the nearest neighbor pixels.

33. The non-transitory computer readable medium of claim 30, wherein the set of executable instructions is to manipulate the at least one processor to iteratively assign the labels to the pixels in parallel using a coordinate ascent procedure until convergence.

* * * * *